United States Patent
Yamada et al.

(10) Patent No.: US 6,971,456 B2
(45) Date of Patent: Dec. 6, 2005

(54) ELECTRIC POWER TOOL (75) Inventors: Yutaka Yamada, Osaka (JP); Hiroshi Iwano, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 247 days.

(21) Appl. No.: 10/657,165

(22) Filed: Sep. 9, 2003

(65) Prior Publication Data

US 2005/0034883 A1 Feb. 17, 2005

(30) Foreign Application Priority Data

Sep. 10, 2002 (JP) .............................. 2002-264433

(51) Int. Cl.[7] .............................................. E21B 3/00
(52) U.S. Cl. ..................................... 173/217; 173/168
(58) Field of Search ............................... 173/168, 217; 227/156; 310/52, 58, 62, 60 A, 64

(56) References Cited

U.S. PATENT DOCUMENTS

| | | | | |
|---|---|---|---|---|
| 2,456,571 A | * | 12/1948 | Turner et al. ................. | 310/50 |
| 2,779,883 A | * | 1/1957 | Schumann .................... | 310/50 |
| 3,121,813 A | * | 2/1964 | Pratt et al. .................... | 310/50 |
| 5,056,607 A | * | 10/1991 | Sanders ........................ | 173/48 |
| 5,632,578 A | * | 5/1997 | McCurry et al. ........... | 409/136 |
| 6,827,157 B2 | * | 12/2004 | Fuchs .......................... | 173/217 |
| 2004/0263008 A1 | * | 12/2004 | Voigt et al. .................. | 310/58 |

FOREIGN PATENT DOCUMENTS

| | | |
|---|---|---|
| JP | 9-11157 | 1/1997 |
| JP | 9-11158 | 1/1997 |

OTHER PUBLICATIONS

English Language Abstract of JP 9-11157.
English Language Abstract of JP 9-11158.

* cited by examiner

*Primary Examiner*—Scott A. Smith
*Assistant Examiner*—Brian Nash
(74) *Attorney, Agent, or Firm*—Greenblum & Bernstein, P.L.C.

(57) ABSTRACT

An electric power tool incorporating a single fan that provides efficient cooling of the motor and transmission while reducing the cost and size of the power tool. The power tool includes a speed reduction transmission provided within a housing between the motor and a chuck which is located at the front end of the power tool. The rotation of the fan cools the motor and the transmission by drawing in external air from intake ports formed in the housing, and collectively exhausts the warmed cooling air through exhaust ports formed in the housing. The power tool includes a fan, located between the motor and the transmission, that is constructed to draw in two separate streams of cooling air from air intake ports located adjacent to the motor and the transmission, and to exhaust used cooling air through exhaust ports located adjacent to the fan.

14 Claims, 9 Drawing Sheets

ELECTRIC POWER TOOL

BACKGROUND OF THE INVENTION

1. Field of the Invention

The invention relates to an electric power tool, and more particularly to an electric power tool equipped with a highly efficient cooling fan to remove thermal energy generated by an electric motor and transmission.

2. Description of Related Art

Electric power tools generally employ a cooling system including a cooling fan attached to the motor output shaft whereby the rotation of the motor spins the cooling fan to draw cooling air to the motor from an upstream intake air duct in the housing, and away from the motor through a downstream exhaust air duct. This type of cooling system, however, is not able to sufficiently cool the transmission whose gears rotate at high RPM and generate a large amount of thermal energy, thus limiting the service life of the transmission.

Figure 14:
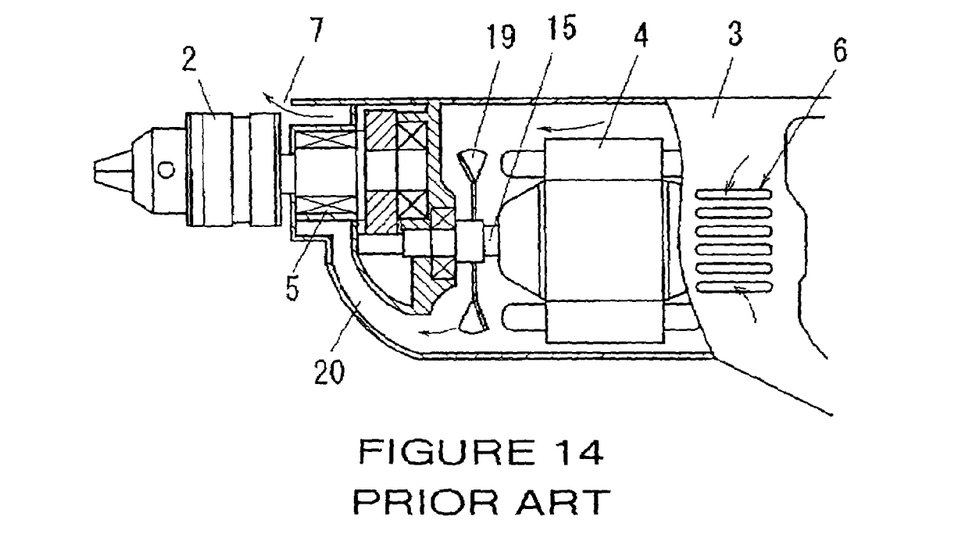
FIG. 14 is a plan view of a conventional electric power tool in which a part of the case has been omitted to provide an internal view.

In an attempt to resolve this problem, an electric power tool of the type disclosed in Japanese Kokai Patent H9-11158 and shown here in FIG. 14 makes use of air intake ports 6 and air exhaust ports 7 formed in housing 3, and air duct 20 formed around or in the vicinity of transmission 5. The rotation of cooling fan 19, which is attached to the output shaft 15 of motor 4, draws in cooling air past motor 4 and into air duct 20 to forcibly cool and thereby extend the service life of transmission 5.

Figure 15:
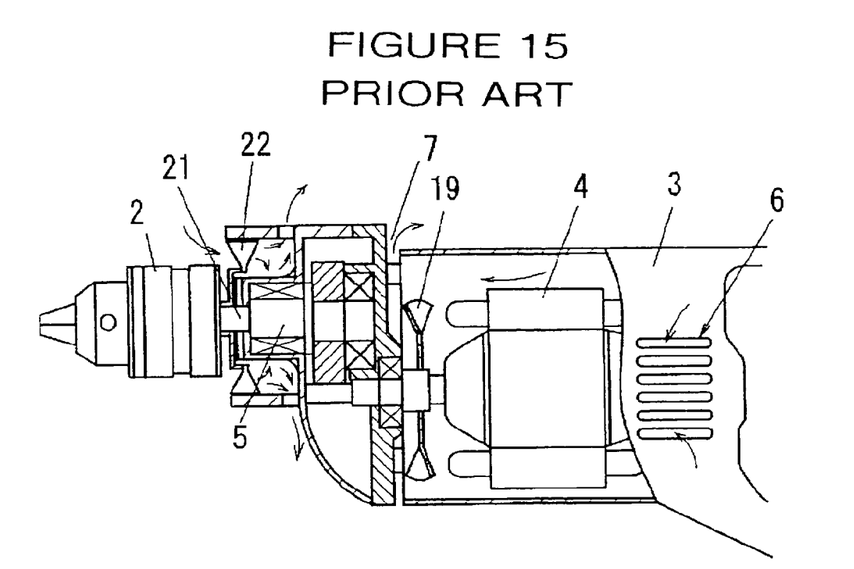
FIG. 15 is a plan view of another type conventional electric power tool in which a part of the case has been omitted to provide an internal view.

Japanese Kokai Patent H9-11157 describes another type of cooling system, shown here in FIG. 15, whereby, in addition to the provision of cooling fan 19, intake ports 6 and exhaust port 7 are formed in housing 3, and cooling fan 22 is attached to rotating shaft 21 that supports chuck 2 at the front of housing 3, thus providing means of forcibly supplying cooling air to and extending the service life of transmission 5.

The mechanism shown in FIG. 14 exhibits a shortcoming in that the air used to remove the thermal energy generated by transmission 5 has been previously warmed as a result of passing through motor 4, a factor that reduces the efficiency with which transmission 5 can be cooled.

Moreover, the structure shown in FIG. 15 exhibits a shortcoming in that the use of motor cooling fan 19 and transmission cooling fan 22 results in a more complex structure that increases both the cost and the size of the power tool.

Figure 16A:
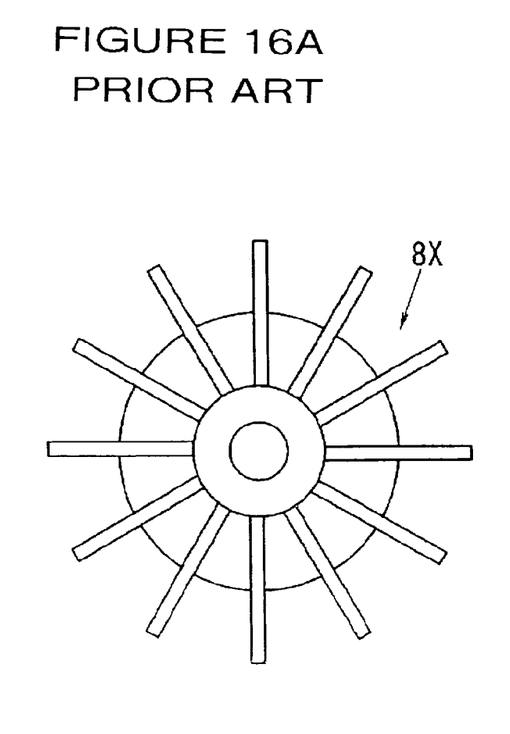
FIG. 16a is a plan view of the fan portion of a conventional electric power tool.
Figure 16B:
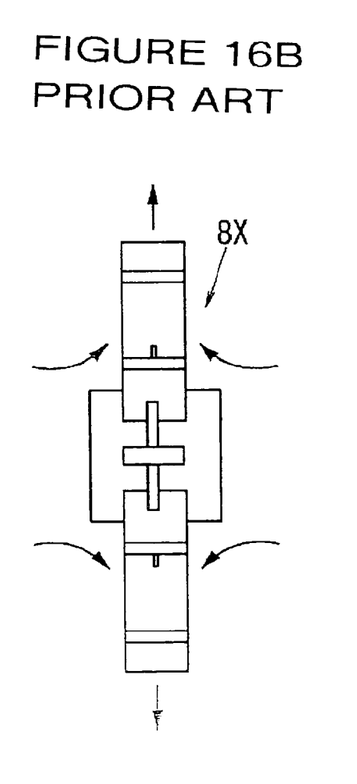

While it is desirable to have the amount of thermal energy generated by the motor and transmission be equal, the difference in thermal energy generated by these two components becomes greater as the power of the motor increases. As shown in FIG. 16, radial fan 8X, which has often been used in electric power tools, draws in an equal volume of air from both sides of the fan. If this type of fan were constructed to deliver a volume of cooling air sufficient to cool the motor, which produces a greater amount of thermal energy than the transmission, the fan would be too large for the cooling requirements of the transmission, and thus put an unnecessary load on the motor.

SUMMARY OF THE INVENTION

Considering the shortcomings of the prior art construction, the present invention provides an electric power tool incorporating a simplified cooling mechanism through which the motor and transmission can be efficiently cooled by a fan that allows the power tool to be made at reduced cost and to more compact dimensions.

The present invention provides an electric power tool that includes a chuck, a motor installed internally to a housing, and a transmission located between the chuck and the motor. The motor and transmission are cooled by the rotation of a fan that draws in air through intake ports formed in the housing, and discharges warmed cooling air from exhaust ports formed in the housing. The fan, which is located between the motor and the transmission, is constructed to draw in air from both the side of the fan facing the motor and the side of the fan facing the transmission. Air intake ports are provided on the motor side of the power tool, air intake ports are provided on the transmission side of the power tool, and air exhaust ports are provided adjacent to the fan.

This construction allows the air drawn in by the fan to flow into the power tool from two directions, that is, through intake ports past the motor, and through intake ports past the transmission, thus providing two separate streams of cooling air respectively supplied to the motor and transmission. The two streams of cooling air, once warmed through the absorption of thermal energy within the power tool, are then collectively discharged through exhaust ports adjacent to the fan. This construction thus allows a single fan to provide a highly efficient cooling function for the motor and transmission, simplifies the construction of the power tool cooling system to reduce cost, and allows the power tool to be made to more compact dimensions.

The present invention further provides a construction by which the fan is able to draw in a larger volume of cooling air through the motor side of the power tool than through the transmission side. A single fan is thus able to supply a larger volume of external air to the motor than to the transmission, and effectively cool the motor which produces a larger amount of thermal energy than the transmission. The fan can thus be made smaller to reduce the load on the motor.

The surface area of motor air intake ports and transmission air intake ports, and the air flow resistance of the passages leading to the fan from intake ports, are used to establish the volume of air that must be drawn in by the fan to effectively absorb the thermal energy generated within the power tool.

The present invention further provides through holes which are formed in a base plate of the fan, and air intake blades which are formed on the motor side of the base plate. Through holes allow air from the side of the fan opposite to the blades to be drawn in by the blades, and thus provide for a simple construction through which the fan is able to draw a larger volume of air for the motor than for the transmission.

The present invention further provides multiple through holes formed at uniform intervals concentrically around the rotating center of the fan. This construction provides a smooth and well-balanced rotational movement of the fan.

The present invention also provides a tapered guide part which is formed on each wall located between each adjacent pair of through holes. This construction improves the intake flow efficiency of the air drawn in via through holes, and thus reduces the load on the motor.

The present invention further provides air intake blades provided on both sides of the base plate of the fan. This construction provides sufficient inflow of air from both sides of the fan.

The present invention further provides a cylindrical boss formed on the fan to fix the fan to the output shaft of the motor. The external diameter of the boss becomes smaller at points increasingly separated from the base plate to smooth the flow of air into the fan, increase intake air flow efficiency, and reduce the load on the motor.

The present invention also provides that at least the base plate of the fan be made from a highly thermally conductive material. This construction allows for the efficient radiation of thermal energy from the base plate, the thermal energy being transferred to the base plate from the motor and transmission through the output shaft.

The present invention further provides that the transmission be covered by a highly thermally conductive case, and that thermal radiation fins be provided on the external surface of the case within an air passage directing the flow of cooling air drawn in by the fan. This construction increases the amount of thermal energy radiated from the surface of the case, allows a reduction in the volume of air required to cool the transmission, and reduces the load on the motor.

An aspect of the present invention provides an electric power tool including a motor; a chuck to attach a tool to a head of the chuck; a transmission provided between the motor and the chuck and configured to transmit power from the motor to the chuck; a housing to store the motor and the transmission, the housing having air intake ports to take in air from the external environment and an exhaust port to expel air therefrom; and a fan provided between the motor and the transmission; wherein the air intake ports are provided in the vicinity of the motor and the transmission, and the exhaust port is provided in the vicinity of the fan, the fan configured to draw in two separate streams of air, a first stream of air drawn in from a motor side of the fan, and a second stream of air drawn in from a transmission side of the fan. The fan may be configured to draw in a larger volume of air from the motor side of the fan than from the transmission side of the fan. Further, the fan may include a first draw portion to draw in the first stream of air from the motor side of the fan and to expel the first stream of air through the exhaust port; and a second draw portion to draw in the second stream of air from the transmission side of the fan and to expel the second stream of air through the exhaust port.

In a further aspect of the present invention, the electric power tool further includes a base plate provided in the fan; the first draw portion of the fan including fan blades provided on a surface of the base plate facing the motor; and the second draw portion of the fan including through holes formed in the base plate. Further, the through holes may be formed concentrically around a rotating center of the base plate. The electric power tool may further include a tapered guide portion provided on each wall located between the through holes, and a cylindrical boss provided on a fan base plate to fix the fan to an output shaft of the motor, an external diameter of the boss becoming smaller at points increasingly further from the base plate.

According to another aspect of the present invention, the electric power tool further includes a base plate provided in the fan; the first draw portion of the fan including a first set of fan blades provided on a surface of the base plate facing the motor; and the second draw portion of the fan including a second set of fan blades provided on a surface of the base plate facing the transmission. Additionally, the first set of fan blades provided on the surface of the base plate facing the motor includes a greater number of fan blades than the second set of fan blades provided on the surface of the base plate facing the transmission, such that the fan draws in a larger volume of air from the motor side of the fan than is drawn from the transmission side of the fan. Further, each fan blade of the first set of fan blades provided on the surface of the base plate facing the motor extends a first distance toward the motor in a direction substantially perpendicular to the base plate and each fan blade of the second set of fan blades provided on the surface of the base plate facing the transmission extends a second distance toward the transmission in a direction substantially perpendicular to the base plate, and wherein the first distance is greater than the second distance such that the fan draws in a larger volume of air from the motor side of the fan than is drawn form the transmission side of the fan. The electric power tool may further include a straightening vane provided adjacent the fan to direct the first and second streams of air to the exhaust port, and the straightening vane may be configured in an annular shape, the straightening vane including a center aperture through which the first stream of air from the motor side of the fan is drawn toward the fan; and at least one air outlet slot provide on the circumference of the annular shaped straightening vane through which air is expelled toward the exhaust port. Additionally, the electric power tool may further include a base plate provided in the fan, the base plate constructed from a highly thermally conductive material. Further, the electric power tool may further include a highly thermally conductive cover portion encasing the transmission; and thermal radiation fins provided on an external side of the cover portion within a passage that directs a cooling air stream drawn in by the fan.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which:

FIG. 13b is a side view of the fan of the embodiment of FIG. 13a;

FIG. 13c is a rear view of the fan of the embodiment of FIG. 13a;

FIG. 16b is a side view of the fan portion of the conventional electric power tool of FIG. 16a.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
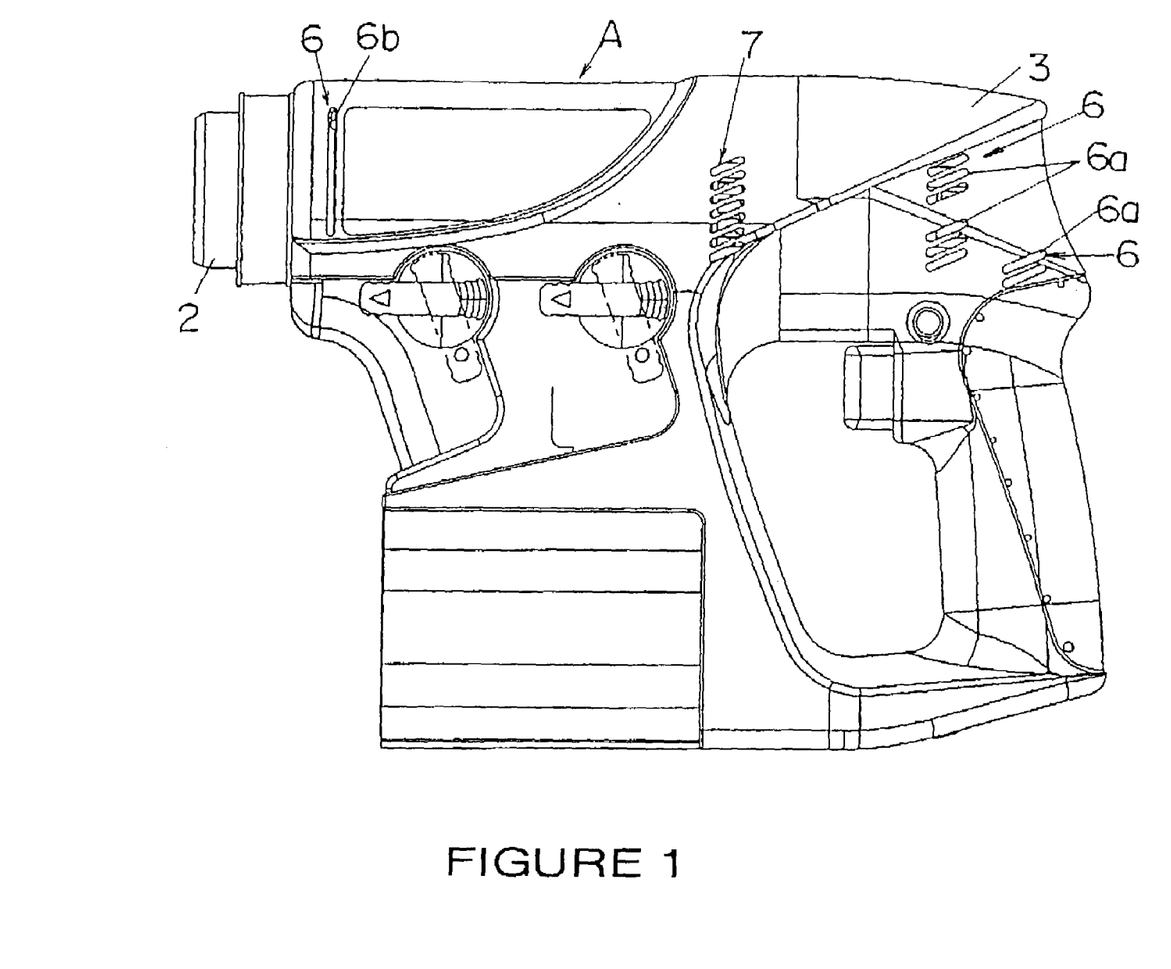
FIG. 1 is a plan view of the power tool according to an embodiment of the present invention.
Figure 2:
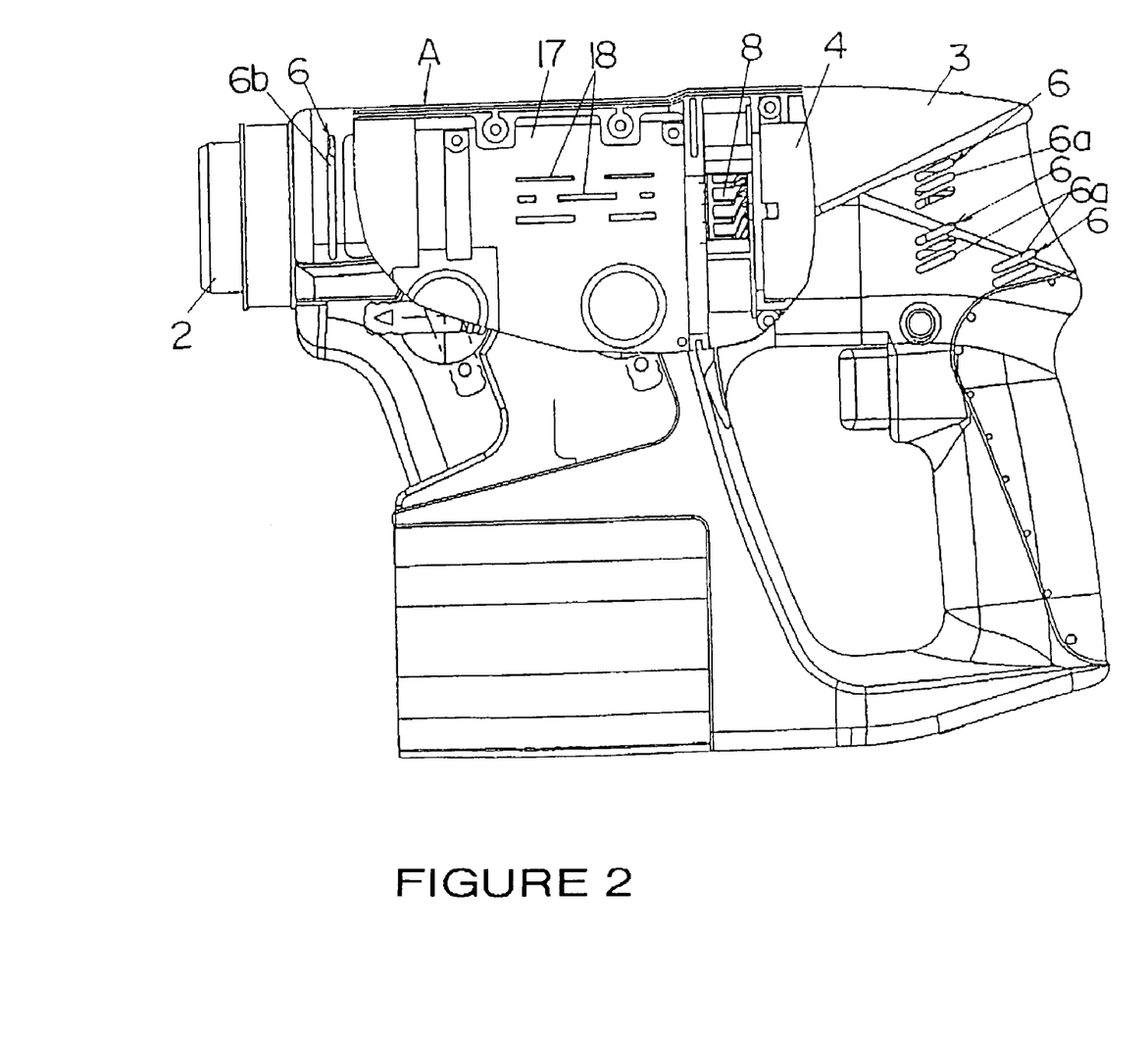
FIG. 2 is a plan view of the power tool of the embodiment of FIG. 1, with a portion of the housing removed.
Figure 3:
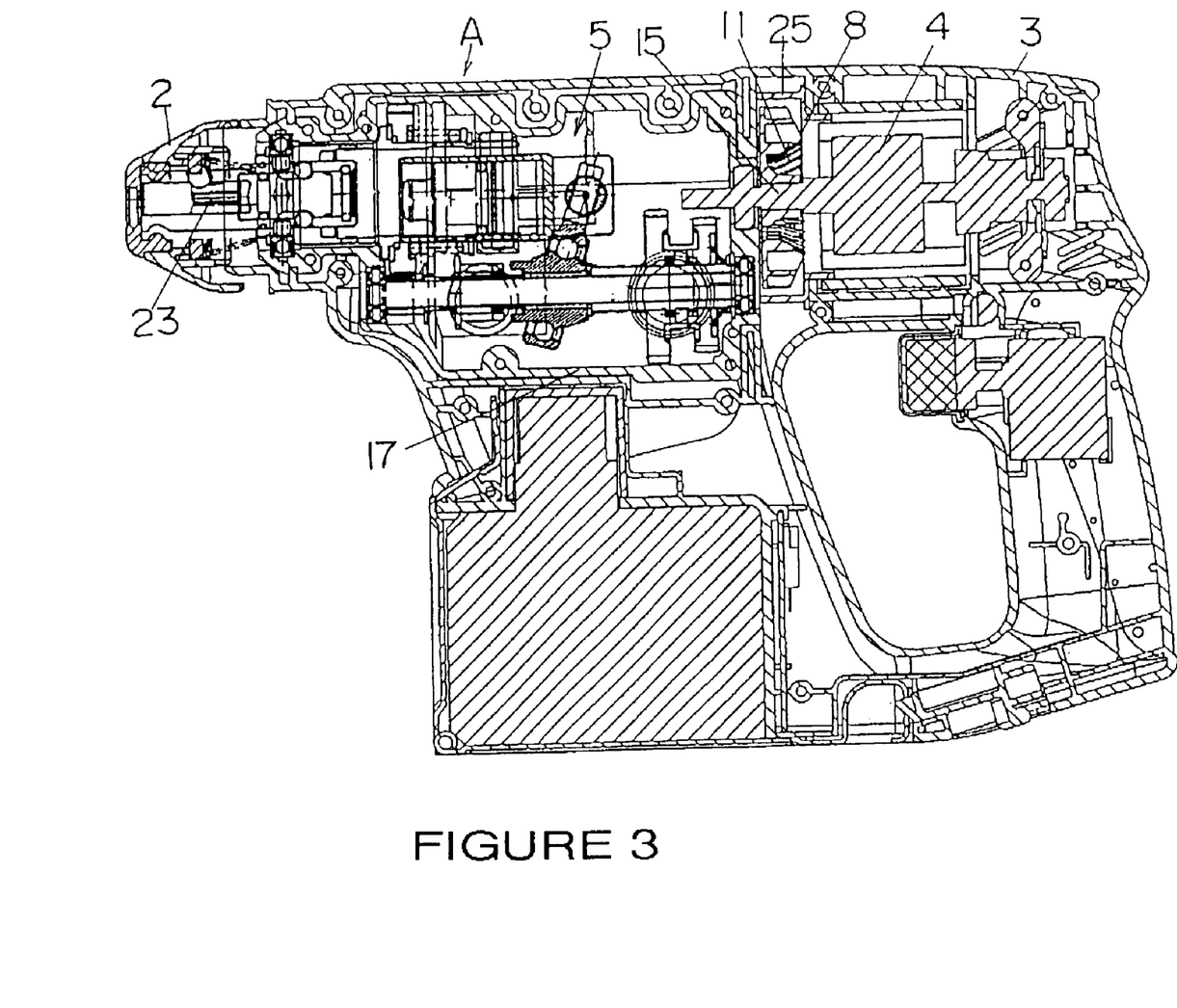
FIG. 3 is a cross sectional view of the power tool of the embodiment of FIG. 1, illustrating the internal components of the power tool.

The following will describe embodiments of the invention. FIG. 1 is a plan view of the power tool of an embodiment of the present invention; FIG. 2 provides a view of internal components of the power tool of FIG. 1 through a portion of the housing that is removed; and FIG. 3 is a cross sectional view illustrating the internal structure.

Electric power tool A includes motor 4 provided in the rear portion of housing 3, and transmission 5, which includes reduction gearing, provided in front of motor 4. A tool holding chuck 2 to attach a tool to the head of the chuck, which is provided in front of transmission 5 at the end of housing 3, receives the torque output from transmission 5 through chuck output shaft 23. Power tool A may take any suitable form such as, for example, a hammer drill, power screwdriver, or power drill.

Power tool A is equipped with fan 8, which is provided on output shaft 15 of motor 4 at a point between motor 4 and transmission 5, to remove thermal energy generated by the electrical losses of motor 4 and the friction of the rotating components in transmission 5.

Power tool A includes a single fan 8 which is able to efficiently remove the large amount of thermal energy generated by motor 4 and transmission 5. The following describes fan 8 in detail.

Fan 8 is constructed so as to draw in air from both the motor 4 side as well as from the transmission 5 side of the power tool. Multiple air intake ports 6a and 6b, and multiple exhaust ports 7 are provided in housing 3, exhaust ports 7 being located adjacent to fan 8.

In this construction, the rotation of fan 8 draws in cooling air from air intake ports 6a located adjacent to the motor, and air intake ports 6b adjacent to the transmission, thus providing separate and independent streams of cooling air to motor 4 and transmission 5. The previously drawn in cooling air streams, which have been warmed by passing through motor 4 and transmission 5, collectively exit through exhaust ports 7 located adjacent to fan 8. The use of a single cooling fan 8, which can efficiently remove thermal energy from both motor 4 and transmission 5, allows the construction of the power tool to be simplified to reduce the cost and size of the power tool.

Figure 4:
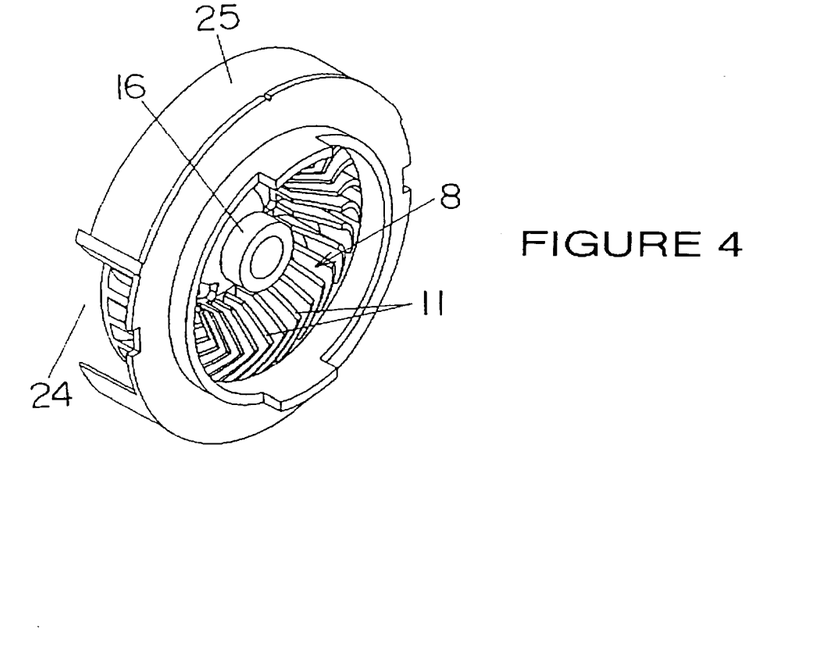
FIG. 4 is an enlarged perspective view of the fan and blades of the power tool of the embodiment of FIG. 1.
Figure 5:
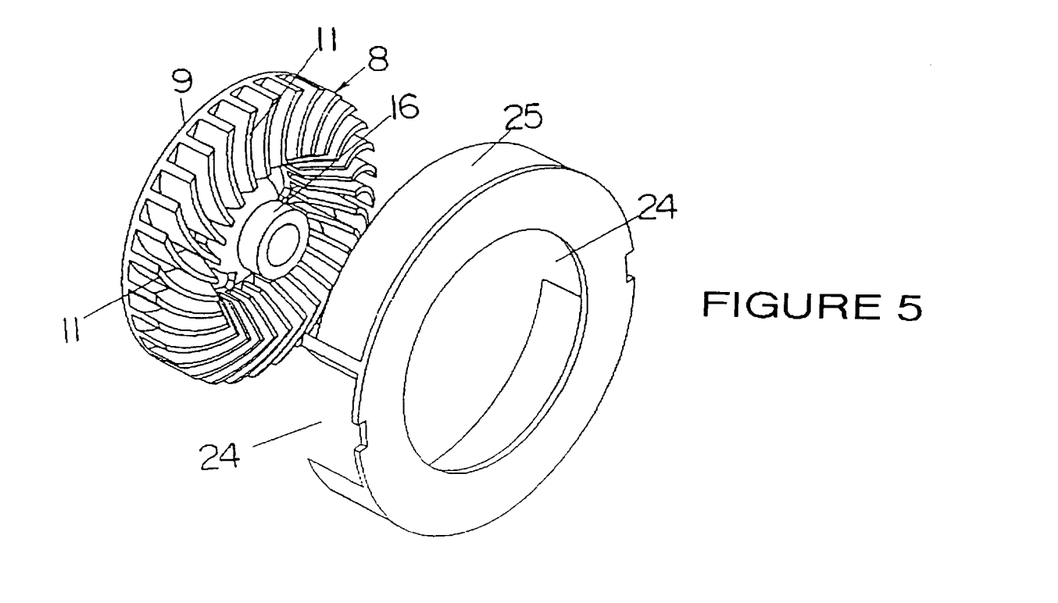
FIG. 5 is an enlarged exploded perspective view of the fan and straightening vane of the power tool of the embodiment of FIG. 1.

As illustrated in FIGS. 4 and 5, a central aperture and air outlet slots 24 are formed in the circumference of ring-shaped or annular shaped straightening vane 25 that surrounds fan 8. Exhaust air drawn in by fan 8 flows into straightening vane 25 through the central aperture from the motor side and from the transmission side where it is smoothly directed through air outlet slots 24 to exhaust ports 7 in housing 3, thus increasing the volume of exhaust air that can flow from housing 3, and thus increasing cooling capacity. Straightening vane 25 may be formed in various appropriate shapes.

Figure 6A:
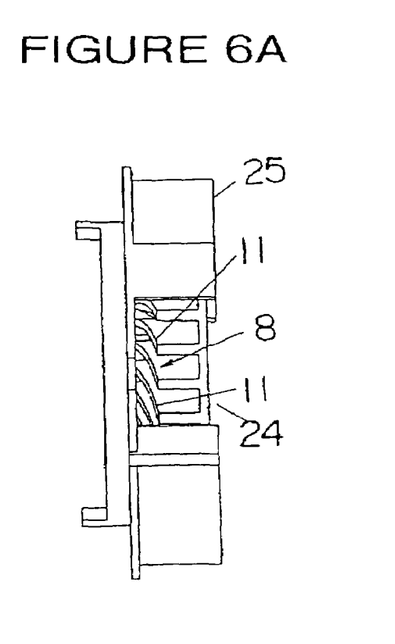
FIG. 6*a* is a side view of the fan and straightening vane shown in FIG. 5.
Figure 6B:
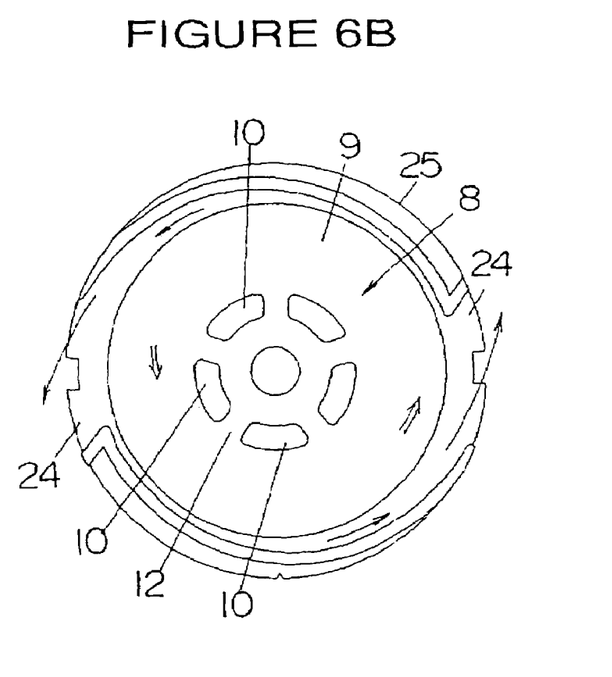
FIG. 6*b* is a plan view of the fan and straightening vane shown in FIG. 5.
Figure 7:
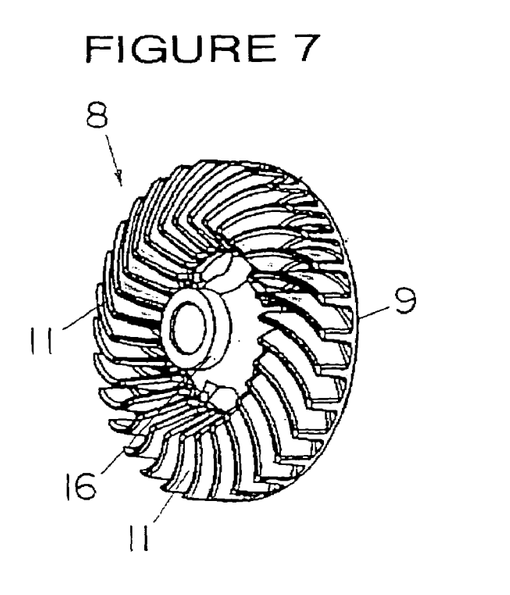
FIG. 7 is an enlarged perspective view of the fan shown in FIG. 5.
Figure 8:
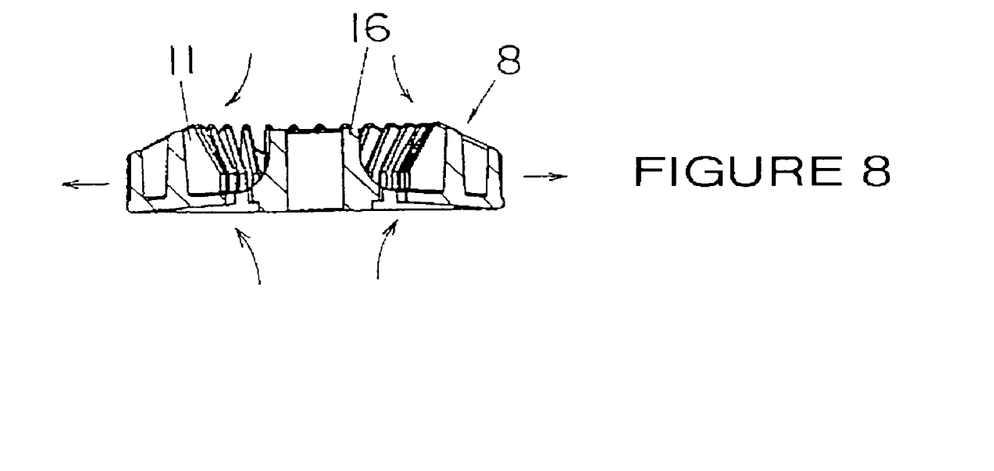
FIG. 8 is an enlarged cross sectional view of the fan shown in FIG. 5.
Figure 9:
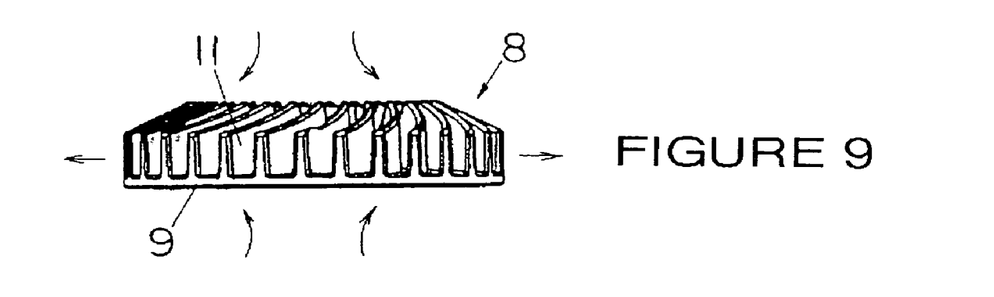
FIG. 9 is an enlarged side view of the fan shown in FIG. 5.
Figure 10:
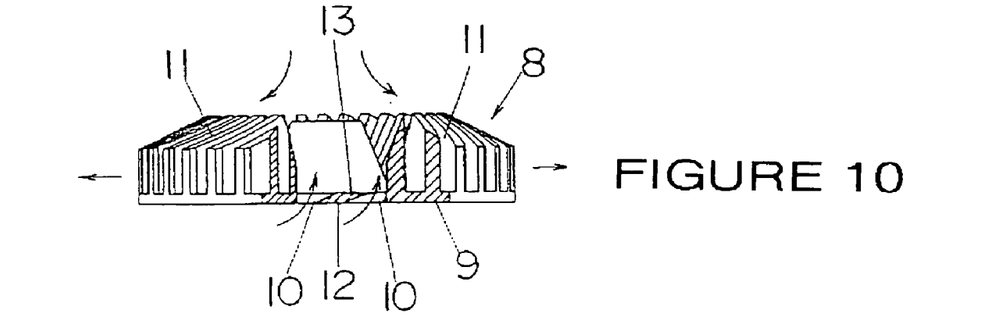
FIG. 10 is an enlarged partial cross sectional view of the fan shown in FIG. 5.

FIGS. 6b, 7, and 10 illustrate the construction of fan 8 in which blades 11 are formed on one surface thereof, and through holes 10 which are formed within base plate 9. This construction allows air to be drawn in from the side of base plate 9 opposite to the intake blades 11, in addition to the air drawn in from the blade 11 side of base plate 9. As the volume of air drawn in from the blade 11 side of base plate 9 is larger than that drawn in from the opposite side of base plate 9, fan 8 is able to draw in a larger volume of air from the motor side of the power tool than from the transmission side.

By means of this construction through which fan 8 draws in a larger volume of air from the motor side than from the transmission side, a single fan 8 is able to effectively cool the greater amount of thermal energy generated by motor 4, thereby allowing fan 8 to be made to smaller dimensions and to reduce the load placed on motor 4.

Moreover, multiple through holes 10 are formed at uniform intervals concentrically around the rotating center of fan 8, thus contributing to the smooth and balanced rotation of fan 8.

Tapered guide portion 13 is formed on the edge of each wall 12, which is the portion of base plate 9 located between each the through holes 10, to increase air inflow efficiency and reduce the load on motor 4.

The surface area of motor air intake ports 6a and transmission air intake ports 6b, as well as the size of the air ducts leading from ports 6a and 6b to fan 8, are established to provide for an air inflow volume sufficient to absorb the amount of thermal energy produced by the power tool.

Figure 12A:
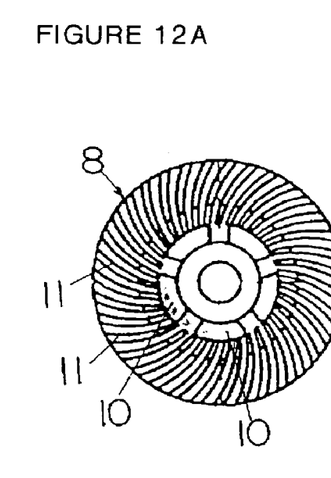
FIG. 12*a* is a plan view of a fan according to a second embodiment of the present invention.
Figures 12B, 12C:
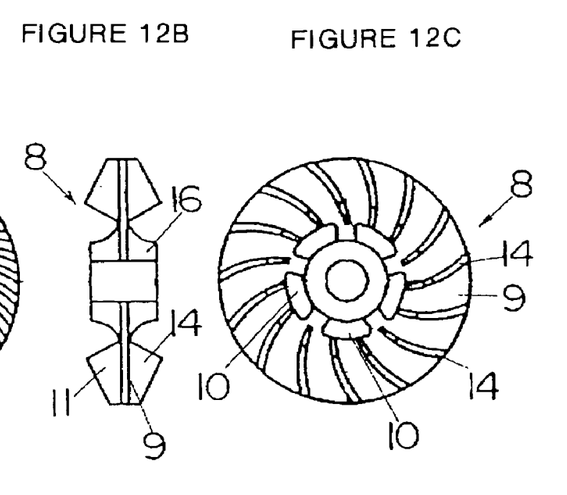
FIG. 12*b* is a side view of the fan of the embodiment of FIG. 12*a*.
FIG. 12*c* is a rear view of the fan of the embodiment of FIG. 12*a*.

FIGS. 12a, 12b, and 12c illustrate a second embodiment of the electric power tool invention. The following description will omit reference to identically numbered components shared by both the first and second embodiments.

In this second embodiment, blades 11 are provided on one side of base plate 9, and fan blades 14 are provided on the other. If the number of blades 11 on the motor side of base plate 9 is greater than the number of blades 14 on the transmission side, fan 8 will draw in a volume of intake air that is larger on the motor side of the fan than on the transmission side. The flow volume generated by blades 11 and 14 can thus be established at levels that provide sufficient streams of cooling air in respect to the thermal energy generated by the motor and transmission.

Figure 13A:
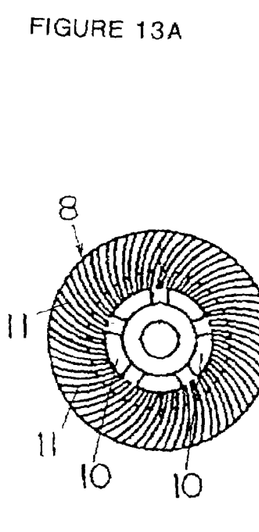
FIG. 13a is a plan view of a fan according to a third embodiment of the present invention.
Figures 13B, 13C:
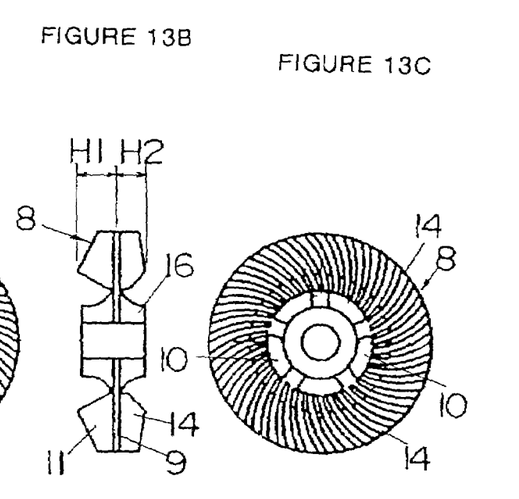

FIGS. 13a, 13b, and 13c illustrate a third embodiment of the electric power tool invention. The following description will omit reference to identically numbered components in the other embodiments.

In this third embodiment, height H1 of blades 11 differ from height H2 of blades 14 to differentiate the volume of air drawn in by each group of blades. That is, by establishing H1 of blades 11 to a height greater than H2 of blades 14, a larger volume of air can be drawn in from the motor side of the power tool than from the transmission side, thereby providing for two separate streams of cooling air in different volumes appropriate to their respective applications.

Figure 11A:
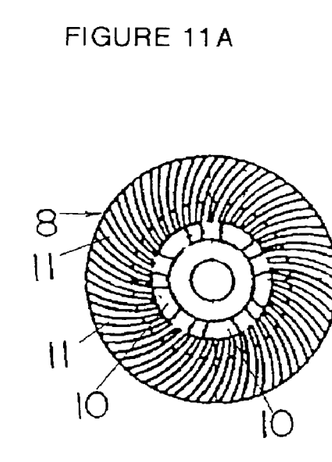
FIG. 11*a* is a plan view of the fan shown in FIG. 5.
Figure 11B:
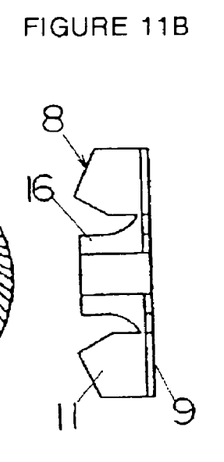
FIG. 11*b* a side view of the fan shown in FIG. 5.
Figure 11C:
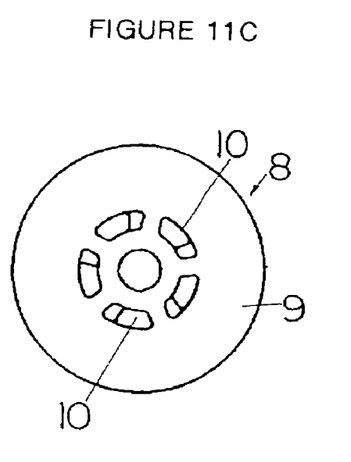
FIG. 11*c* a rear view of the fan shown in FIG. 5.

In the embodiments presented in FIGS. 11 through 13, cylindrical boss 16 is provided to allow the attachment of fan 8 to shaft 15 of motor 4. Cylindrical boss 16 has an external diameter that becomes smaller at points increasingly farther from base plate 9 to smooth the air flow into fan 8, increase intake air flow efficiency, and reduce the load on motor 4.

Moreover, base plate 9 and cylindrical boss 16 of the these fan 8 embodiments may be made from a highly thermally conductive material, and thus provide for improved cooling efficiency through the radiation of thermal energy, which is generated by motor 4 and transmission 5 and transferred to base plate 9 through output shaft 15, from the surface of base plate 9.

In regard to the construction of transmission 5 in these embodiments, highly thermally conductive case 17 is provided as a covering part over transmission 5. Thermal radiation fins 18 are formed on the external surface of case 17 within a cooling air passage to increase the radiation of thermal energy from the surface of case 17, thus allowing the volume of air drawn in for transmission cooling to be reduced and reducing the load on motor 4.

The present invention provides a construction whereby a rotating fan is able to draw in air from two directions; that is, from intake ports adjacent to the motor and from intake ports adjacent to the transmission. The present invention provides for separate streams of cooling air directed to the motor and transmission, collectively exhausts used cooling air through exhaust ports located adjacent to the fan, and allows a single fan to provide improved motor and transmission cooling efficiency, thus providing the benefits of more effective cooling of the motor and transmission and a simplified cooling structure that reduces both the cost and the size of the power tool.

The present invention also provides the benefits of a single fan able to draw in a larger volume of external air from the motor side of the fan than from the transmission side, effectively cool the motor which generates a larger volume of thermal energy than the transmission, decrease fan size, and reduce the load on the motor.

Additionally, the present invention provides the benefit of a fan construction through which through holes in the fan allow air to be drawn to the intake blade side of the fan base plate from the opposite side thereof, in addition to air that is drawn in from the intake blade side of the base plate. Because the fan draws in a greater volume of air from the intake blade side of the fan, and because the intake blades of the fan face the motor, a larger volume of cooling air can be drawn through the motor than through the transmission.

The present invention also provides the benefit of a smooth and well-balanced rotational movement of the fan.

The present invention further provides the benefits of improved air flow efficiency through the through holes and a reduced load on the motor.

Further, the present invention provides the benefit of an adequate air inflow volume from both sides of the fan.

The present invention construction provides the benefits of a smooth flow of intake air to the fan, high intake air flow efficiency, and a reduced load on the motor made possible by a cylindrical boss having an external diameter that becomes smaller at points increasingly separated from the base plate.

The present invention construction provides the benefit of improved cooling efficiency made possible by the radiation of thermal energy, which is generated by the motor and transmission and transferred to the fan base plate through the motor output shaft, from the surface of a highly thermally conductive fan base plate.

The present invention also provides the benefit of increased thermal radiation from the surface of a case that covers the transmission, thereby reducing the volume of air required to cool the transmission and reducing the load on motor 4.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. JP 2002-264433, filed on Sep. 10, 2002, which is herein expressly incorporated by reference in its entirety.

What is claimed is:

1. An electric power tool comprising:
    a motor;
    a chuck to attach a tool to a head of said chuck;
    a transmission provided between said motor and said chuck and configured to transmit power from said motor to said chuck;
    a housing to store said motor and said transmission, said housing having separate air intake ports to take in air from the external environment and an exhaust port to expel air therefrom; and
    a fan provided between said motor and said transmission;
    wherein said air intake ports are provided in the vicinity of said motor and said transmission, respectively, and said exhaust port is provided in the vicinity of said fan, said fan configured to draw in two separate streams of air from said separate air intake ports, respectively, a first stream of air drawn in from a motor side of said fan, and a second stream of air drawn in from a transmission side of said fan.

2. The electric power tool according to claim 1 wherein said fan is configured to draw in a larger volume of air from said motor side of said fan than from said transmission side of said fan.

3. The electric power tool according to claim 1, said fan further comprising:
    a first draw portion to draw in said first stream of air from said motor side of said fan and to expel said first stream of air through said exhaust port; and
    a second draw portion to draw in said second stream of air from said transmission side of said fan and to expel said second stream of air through said exhaust port.

4. The electric power tool according to claim 3, further comprising:
    a base plate provided in said fan;
    said first draw portion of said fan including fan blades provided on a surface of said base plate facing said motor; and said second draw portion of said fan including through holes formed in said base plate.

5. The electric power tool according to claim 4, wherein said through holes are formed concentrically around a rotating center of said base plate.

6. The electric power tool according to claim 3, further comprising:
a base plate provided in said fan;
said first draw portion of said fan including a first set of fan blades provided on a surface of said base plate facing said motor; and
said second draw portion of said fan including a second set of fan blades provided on a surface of said base plate facing said transmission.

7. The electric power tool according to claim 6, wherein said first set of fan blades provided on said surface of said base plate facing said motor includes a greater number of fan blades than said second set of fan blades provided on said surface of said base plate facing said transmission, such that said fan draws in a larger volume of air from said motor side of said fan than is drawn from said transmission side of said fan.

8. The electric power tool according to claim 6, wherein each fan blade of said first set of fan blades provided on said surface of said base plate facing said motor extends a first distance toward said motor in a direction substantially perpendicular to said base plate and each fan blade of said second set of fan blades provided on said surface of said base plate facing said transmission extends a second distance toward said transmission in a direction substantially perpendicular to said base plate, and
wherein said first distance is greater than said second distance such that said fan draws in a larger volume of air from said motor side of said fan than is drawn from said transmission side of said fan.

9. The electric power tool according to claim 4, further comprising:
a tapered guide portion provided on each wall located between said through holes.

10. The electric power tool according to claim 1, further comprising:
a cylindrical boss provided on a fan base plate to fix said fan to an output shaft of said motor, an external diameter of said cylindrical boss becoming smaller at points increasingly farther from said base plate.

11. The electric power tool according to claim 1, further comprising:
a straightening vane provided adjacent said fan to direct said first and second streams of air to said exhaust port.

12. The electric power tool according to claim 11, wherein said straightening vane is configured in an annular shape, said straightening vane comprising:
a center aperture through which said first stream of air from said motor side of said fan is drawn toward said fan; and
at least one air outlet slot provide on the circumference of said annular shaped straightening vane through which air is expelled toward said exhaust port.

13. The electric power tool according to claim 1, further comprising:
a base plate provided in said fan, said base plate constructed from a highly thermally conductive material.

14. The electric power tool according to claim 1, further comprising:
a highly thermally conductive cover portion encasing said transmission; and
thermal radiation fins provided on an external side of said cover portion within a passage that directs a cooling air stream drawn in by said fan.

* * * * *